(12) United States Patent
Akers et al.

(10) Patent No.: US 6,711,920 B2
(45) Date of Patent: Mar. 30, 2004

(54) KNIT CONVOLUTE PROTECTIVE SLEEVE

(75) Inventors: Jessica L. Akers, El Paso, TX (US); Janice R. Maiden, Flourtown, PA (US); Danny E. Winters, Downingtown, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/277,297

(22) Filed: Oct. 22, 2002

(65) Prior Publication Data

US 2003/0089971 A1 May 15, 2003

Related U.S. Application Data

(60) Provisional application No. 60/332,181, filed on Nov. 14, 2001.

(51) Int. Cl.$^7$ ................................................. D04B 1/22
(52) U.S. Cl. ........................... 66/170; 66/202; 138/123
(58) Field of Search ............................... 138/121, 123, 138/118, 110, 122; 66/169 R, 170, 195, 197, 200, 202, 27, 54, 77

(56) References Cited

U.S. PATENT DOCUMENTS

| | | | |
|---|---|---|---|
| 1,344,501 A | * 6/1920 | Gilpin et al. ............... 138/123 |
| 2,222,522 A | 11/1940 | Webster ...................... 308/243 |
| 2,836,181 A | * 5/1958 | Tapp ........................... 606/155 |
| 2,881,603 A | 4/1959 | Vendetti .......................... 66/9 |
| 3,044,497 A | * 7/1962 | Rebut .......................... 138/121 |
| 3,567,562 A | 3/1971 | Gordon et al. ................. 161/7 |
| 3,862,878 A | 1/1975 | Azuma .......................... 161/58 |
| 5,300,337 A | 4/1994 | Andrieu et al. ............. 428/36.1 |
| 5,509,282 A | 4/1996 | Ferrell, Jr. .................... 66/188 |
| 5,538,045 A | 7/1996 | Piotrowski et al. ......... 138/147 |
| 5,712,007 A | * 1/1998 | Mercuri ...................... 428/34.8 |
| 5,843,542 A | 12/1998 | Brushafer et al. .......... 428/36.1 |
| 5,965,223 A | * 10/1999 | Andrews et al. ........... 428/34.5 |
| 6,082,144 A | * 7/2000 | Jencks et al. ................. 66/170 |
| 6,116,287 A | * 9/2000 | Gropp et al. ............... 138/114 |
| 6,230,748 B1 | * 5/2001 | Krawietz et al. ........... 138/121 |

* cited by examiner

*Primary Examiner*—Danny Worrell
(74) *Attorney, Agent, or Firm*—Synnestvedt & Lechner LLP

(57) ABSTRACT

A knitted convolute protective sleeve is disclosed. The sleeve is knitted from filamentary members to form alternating crests and troughs lengthwise along the sleeve. The crests and troughs may be formed by alternatingly knitting segments from relatively stiff and relatively flexible filamentary members, by interlacing stiffening hoops at spaced intervals lengthwise along a knitted sleeve having a smaller nominal diameter than the hoops, or by varying the knitting parameters, such as loop density and loop length as a function of length along the sleeve.

20 Claims, 3 Drawing Sheets

KNIT CONVOLUTE PROTECTIVE SLEEVE

RELATED APPLICATION

This application is based on and claims the benefit of U.S. Provisional Application No. 60/332,181, filed Nov. 14, 2001.

FIELD OF THE INVENTION

This invention relates to sleeving for the protection of elongated substrates and especially to convolute sleeving having improved flexibility and radial stiffness.

BACKGROUND OF THE INVENTION

Convolute sleeving is used across a broad range of industrial applications, particularly in electronics, aerospace and automotive applications to provide protection to elongated substrates, such as wiring harnesses and fluid conduits, particularly hydraulic lines and fuel lines, from harsh environments. A wiring harness, fuel line or hydraulic line may be subjected to extremes of heat and cold, radio frequency/electromagnetic interference (RFI/EMI), severe vibration, abrasion and physical impact damage when used in the engine compartment of an aircraft or automobile or on an orbiting satellite.

Convolute sleeving is often used to ensheath and protect such elongated substrates from heat, cold, abrasion, vibration and impact damage as well as to provide acoustical damping or shield electrical conductors from RFI/EMI. Because such sleeving is formed having a series of alternating crests and troughs, it has both excellent radial stiffness and bending flexibility. The radial stiffness prevents the sleeving from kinking and collapsing when bent and the flexibility allows it to follow almost any curved shape and, thus, conform readily to the path of the elongated substrate without adding any significant bending stiffness which would otherwise make the substrate difficult to install.

Convolute sleeving is generally more expensive to produce than non-convolute sleeving because extra processing steps are required to produce the convolutes. For example, convolute sleeving formed from an extruded plastic tube requires an additional machine having circulating mold halves which engage the tube and form the convolutes along the tube while it is being drawn from the die in a semi-molten state. There is clearly a need for a convolute sleeve which is more easily and economically manufactured.

SUMMARY AND OBJECTS OF THE INVENTION

The invention concerns an elongated convolute sleeve for protecting elongated substrates. In one embodiment, the sleeve comprises a plurality of tubular first segments positioned coaxially in spaced relation lengthwise along an axis. Each of the first segments is comprised of a plurality of flexible, resilient first filamentary members knitted in a plurality of first courses. Each of the segments has outwardly flared ends oppositely disposed. The sleeve also comprises a plurality of tubular second segments, each being formed of a plurality of second filamentary members having relatively greater flexibility than the first filamentary members. The second filamentary members are knitted in a plurality of second courses, each of the second segments being coaxially positioned along the same axis as the first segments and joined with the first segments end to end in an alternating pattern by interknitting the ends of the second segments with the flared ends of the first segments. The first segments form a plurality of troughs and the second segments form a plurality of crests projecting radially outwardly from the sleeve.

Another embodiment of the convolute sleeve according to the invention comprises a tubular body having a nominal diameter and formed of a plurality of flexible, resilient filamentary members knitted in a plurality of circumferential courses extending substantially coaxial with and lengthwise along an axis. A plurality of resilient hoops, preferably formed from a monofilament, are positioned in spaced relation lengthwise along the tubular body coaxially with the axis. The hoops each have a respective diameter greater than the nominal diameter of the body and are interlaced with the filamentary members, preferably by laying in, and thereby fixing the hoops to the body. The diameter of the body is substantially equal to the hoop diameters at spaced intervals along the body where the hoops are interlaced with the filamentary members because the monofilament forming the hoops is relatively stiffer than the filamentary members forming the tubular body. The hoops force the body outwardly to form crests in spaced relation to one another along the axis, troughs being formed by the body between each hoop.

Yet another embodiment of the convolute sleeve according to the invention comprises a tubular body having a plurality of first and second longitudinally extending regions arranged in spaced relation coaxially along an axis. The first and second regions are positioned adjacent one another in an alternating pattern and are formed from a plurality of filamentary members knitted in a plurality of courses. Each course comprises a plurality of loops extending circumferentially around the axis. To form the crests and troughs of the convolute sleeve, the stiffness of the first regions are different from the stiffness of the second regions. The stiffness of the regions maybe varied by changing the material from which the regions are knitted or by varying knitting parameters such as the density or length of the loops forming the courses.

It is an object of the invention to provide an elongated protective sleeve.

It is another object of the invention to provide a protective sleeve which is manufactured by knitting.

It is still another object of the invention to provide a convoluted knitted sleeve.

It is again another object of the invention to provide a convoluted sleeve wherein the convolutions are formed by interknitting filamentary members having different stiffness.

It is still another object of the invention to provide a convoluted sleeve wherein the convolutions are formed by varying the knitting parameters as a function of length along the sleeve.

It is yet another object of the invention to provide a convoluted sleeve wherein the convolutions are formed by a plurality of interlaced circular hoops.

These and other objects and advantages of the invention will become apparent upon consideration of the drawings and the description of the preferred embodiments.

BRIEF DESCRIPTION OF THE DRAWINGS

FIG. 1A illustrates a portion of the sleeve shown in FIG. 1 on an enlarged scale;

FIG. 1B illustrates another portion of the sleeve shown in FIG. 1 on an enlarged scale;

FIG. 2A illustrates a portion of the sleeve shown in FIG. 2 on an enlarged scale;

FIG. 2B illustrates another portion of the sleeve shown in FIG. 2 on an enlarged scale;

DETAILED DESCRIPTION OF THE PREFERRED EMBODIMENTS

Figure 1:
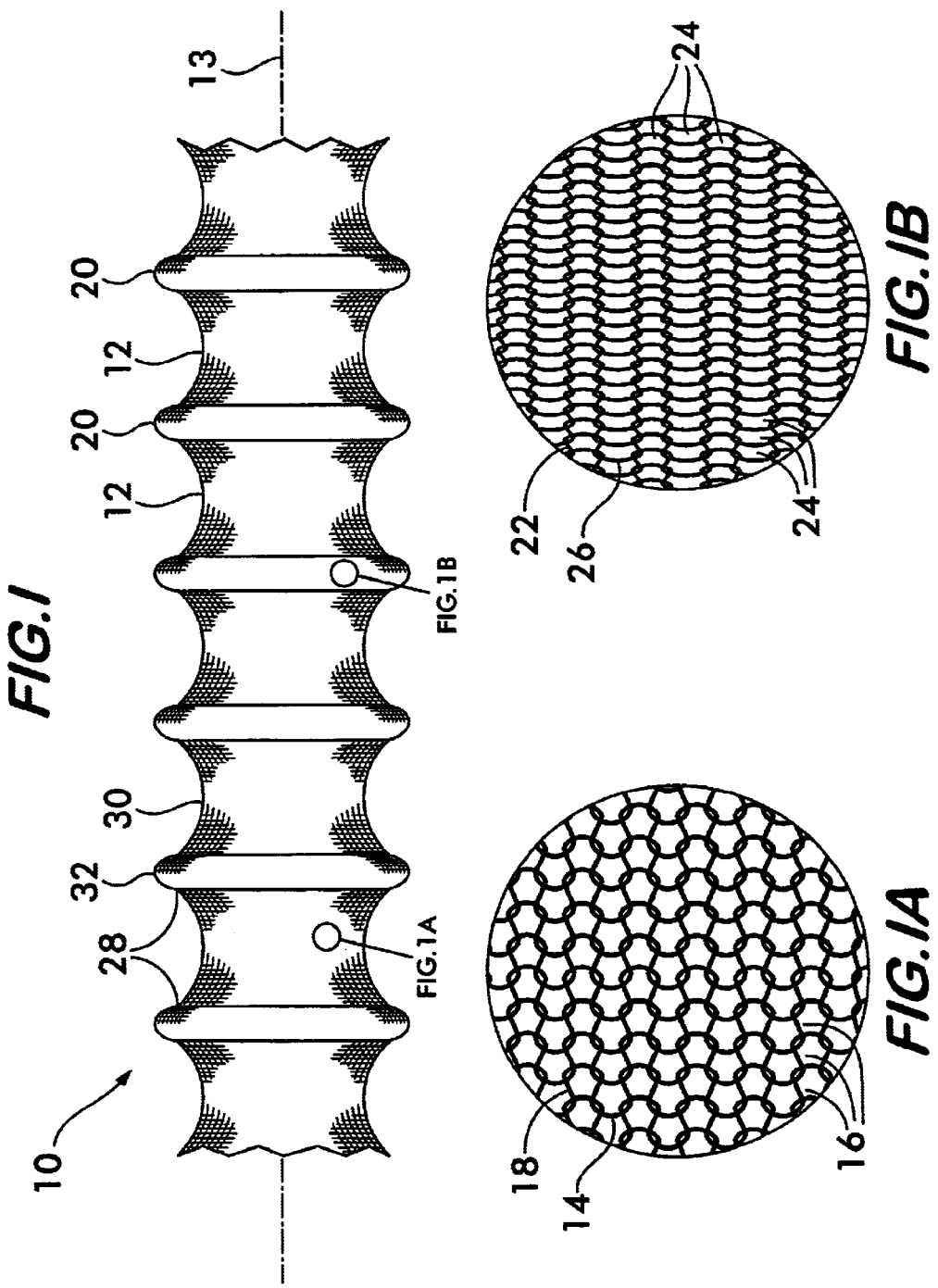
FIG. 1 is a side view of an embodiment of a knitted convolute sleeve according to the invention.

FIG. 1 shows an embodiment of the knitted convolute sleeve 10 according to the invention. Sleeve 10 is formed of a plurality of tubular first segments 12 positioned coaxially in spaced relation along an axis 13. As shown on an enlarged scale in FIG. 1A, first segments 12 are knitted of a plurality of filamentary members 14 forming courses 16 of loops 18 which extend circumferentially around sleeve 10. The sleeve also has a plurality of tubular second segments 20 positioned coaxially along axis 13 in an alternating pattern with segments 12. As shown on an enlarged scale in FIG. 1B, second segments 20 are knitted of a plurality of filamentary members 22 forming courses 24 of loops 26 which extend circumferentially around sleeve 10. The first and second segments are interknitted together end to end in alternating fashion to form the sleeve 10.

Filamentary members 14 comprising first segments 12 are flexible, resilient and have greater stiffness than the filamentary members 22 comprising second segments 20. Preferably, filamentary members 14 are stiff monofilaments of a polymeric material such as polyester, nylon, polypropylene, polyethylene and the like. Metal filaments comprised of flexible, resilient materials having a large elastic modulus such as steel, titanium, nitinol, elgiloy are also feasible, as are DREF yarns. Stiff monofilaments are preferred because they have little capability to stretch and will form a knitted sleeve which supports itself in a tubular shape.

Preferably, filamentary members 22 are flexible multifilament, non-texturized yarns of polymeric material such as polyester, nylon and polytetrafluoroethylene. Multifilament yarns are preferred because they are inherently flexible and will not restrain the filamentary members 14 when the first and second segments are interknitted to form the sleeve as described below. Although multi-filament yarns are preferred, monofilaments of lower stiffness are also feasible.

It is observed that when stiff filamentary members such as 14 are knitted to form a segment such as 12 having a substantially tubular shape, the ends 28 of the segment, if substantially unrestrained, tend to flare radially outwardly as depicted in FIG. 1. The flaring occurs without the need for heat setting, cold forming or any other additional processing steps and likely results from a combination of the symmetric cross section of the segment and internal residual stresses within the stiff filamentary members 14 caused by forming the courses 16 of loops 18. When unrestrained, the courses near the ends 28 assume a shape which relieves the internal stresses within the filamentary members and minimizes their internal elastic energy. Second segments 20, formed of more flexible filamentary members 22, do not have sufficient stiffness to constrain the ends 28 and, thus, serve to link the first segments 12 together when interknitted.

Figure 2:
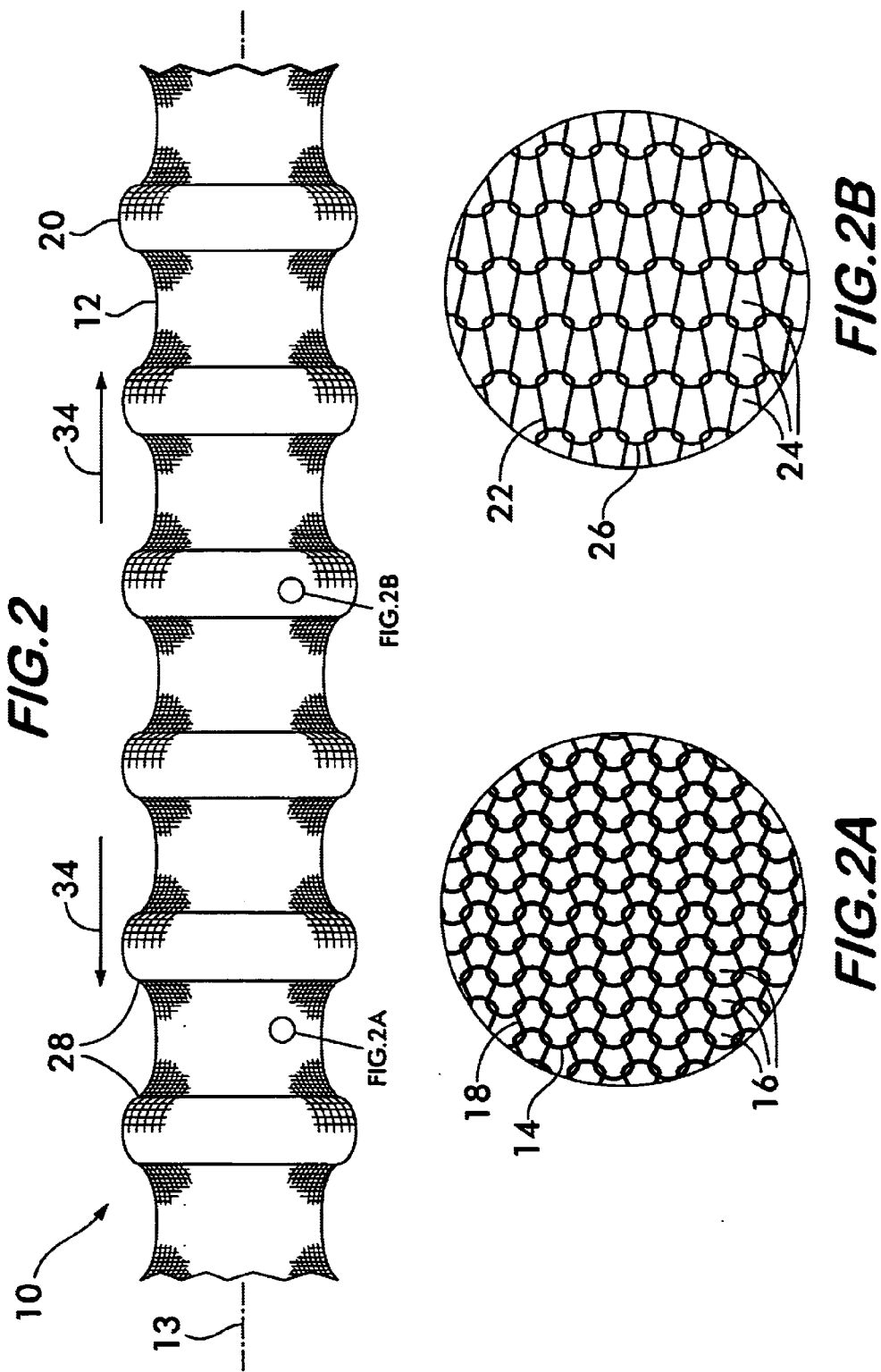
FIG. 2 is a another side view of the knitted convolute sleeve shown in FIG. 1.

When segments 12 are interknitted end-to-end with segments 20, the flaring ends 28 of segments 12 result in sleeve 10 assuming a convolute shape substantially over its length with segments 12 forming troughs 30 and segments 20 forming crests 32 projecting radially outwardly from the sleeve. The sleeve, thus, has the various advantages of the convolute shape, i.e., excellent bending flexibility coupled with radial stiffness to prevent kinking and collapse of the sleeve when it is bent or curved. Forming segments 20 from filamentary members 22 comprised of smooth monofilaments or multifilament yarns will produce a sleeve having pronounced crests and troughs since such smooth, flexible filamentary members will slide over one another readily and not constrain ends 28 of segments 12. Roughened or texturized filamentary members 22 will tend to constrain ends 28 to a greater degree and, thus, reduce the variation in size between crests and troughs. Sleeve 10 also has axial flexibility which tends to be concentrated in second segments 20. As shown in FIG. 2, when sleeve 10 is subjected to a tensile load along axis 13 as indicated by arrows 34, loops 26, comprised of the flexible filamentary members 22, tend to stretch as shown in detail on an enlarged scale in FIG. 2B, allowing the sleeve 10 to expand axially. Axial flexibility is greater when non-texturized filamentary members 22 are used which allow the filamentary members to slide easily over one another with little friction. Because they are stiffer, filamentary members 14 comprising first segments 12 tend not to stretch under tensile loads and remain substantially undistorted as shown in FIG. 2A.

While segments 12 and 20 may be formed of virtually any number of courses 16 and 24 respectively, a practical sleeve is preferably formed with segments 12 having 3 courses of loops 18 and segments 20 having 2 courses of loops 26. This configuration provides a sleeve 10 having pronounced crests 32 and troughs 30 for adequate radial stiffness and bending flexibility without excessive axial flexibility. In general, more courses comprising segments 20 result in greater axial flexibility of the sleeve, and fewer courses comprising segments 12 yield a sleeve having more bending flexibility able to conform to smaller bend radii without kinking. Practical sleeves 10 have also been achieved with segments 12 having 5 or 10 courses and segments 20 having 2 courses. Thus, the preferred ratio of courses 16 in the first (stiffer) segments 12 to courses 24 in the second (less stiff) segments 20 ranges between 3 to 2 and 5 to 1.

Sleeve 10 is preferably weft knitted on a striping knitting machine. Such machines have a plurality of latch needles, circularly arranged, which rotate past a plurality of feet which feed the filamentary members to the needles. Each foot feeds a different filamentary member as a continuous strand to the needles, and the feet move into or out of action as necessary to feed a particular filamentary member as desired. For example, while knitting a segment 12, a first foot having filamentary member 14 thereon is in action, feeding the filamentary member to the needles, which knit a desired number of courses comprising the segment. When courses of the following segment 20 are to be knitted, the first foot is moved out of action and a second foot having filamentary member 22 thereon is moved into action to feed the needles. The first course of segment 20 is, thus interknitted with the last course of segment 12, and the process is repeated, alternately bringing one foot and the other into and out of action to form the sleeve 10.

When using a monofilament to form segments 12, the segments may have visible interstices. It is possible to block the interstices by feeding an additional filamentary member with the monofilament. Preferably, the additional filamentary member is a twisted or spun yarn having sufficient bulk to fill the interstices. Such a yarn has a natural tendency to plait on the inside surface of the segment and, thus, may be used to provide damping for attenuating vibration of the elongated substrate within the sleeve.

Figure 3:
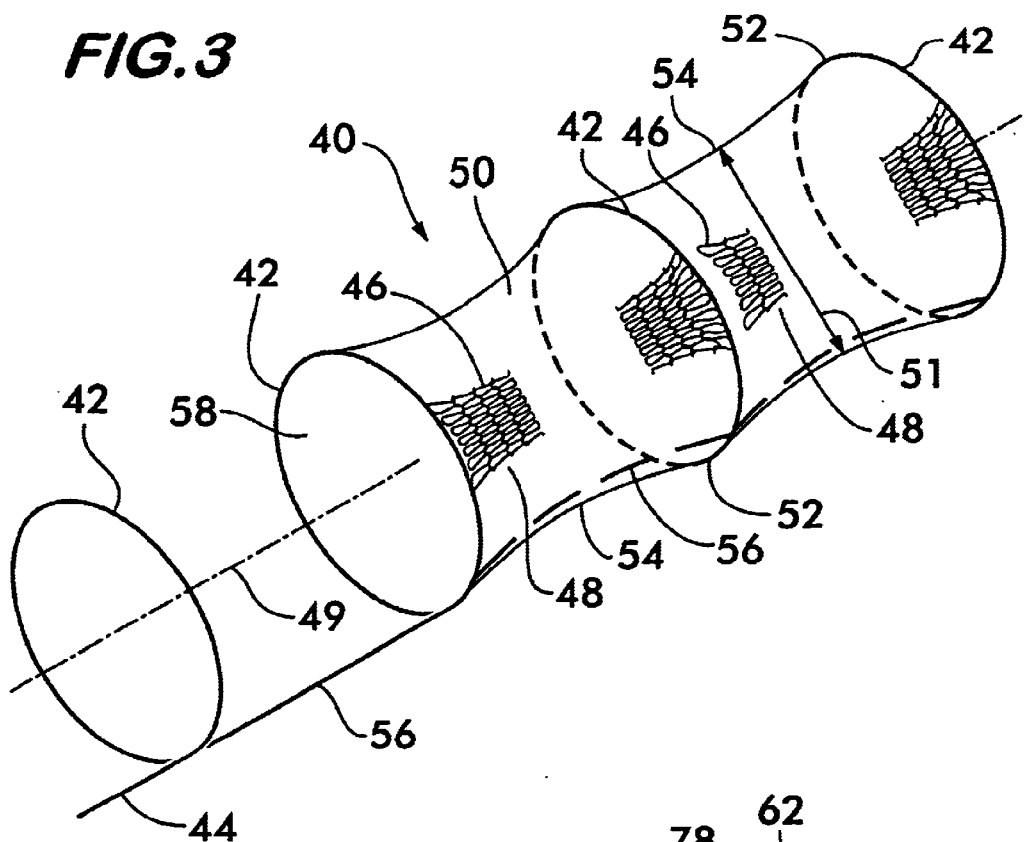
FIG. 3 is a partial perspective view of another embodiment of a knitted convolute sleeve according to the invention.

FIG. 3 shows another embodiment of a convolute sleeve 40 comprised of a plurality of hoops 42 preferably formed of a stiff, resilient monofilament filamentary member 44. Hoops 42 are interlaced with flexible filamentary members 46 (preferably being laid-in) which are knitted in a plurality of courses 48 which extend circumferentially around a longitudinal axis 49 to form a tubular body 50 having a nominal diameter 51. Hoops 42 are stiff and remain substantially circular in shape, and when fixed in place by the knitted filamentary members 46, the hoops 42 form a skeleton supporting the body 50 in its tubular shape. The tubular body 50 is knitted to have its nominal diameter 51 smaller than the diameter of hoops 42 so that the body is forced outwardly over the hoops to form crests 52 at each hoop 46 and troughs 54 between the hoops to give the sleeve 40 a convolute shape.

Preferably, hoops 42 are continuously laid in as the tubular body 50 is knitted, resulting in each hoop being connected by an axial strand portion 56 of the stiff filamentary member 44. Axial strand portion 56 may float on a surface of tubular body 50 or be interlaced with the filamentary members 46, preferably by laying-in.

Preferred materials for the stiff filamentary member comprising hoops 42 are polymerics such as nylon, polyester, polypropylene, polyethylene and polytetrafluoroethylene. Metals such as steel, titanium, nitinol, elgiloy are also feasible, especially for sleeves intended for use in high temperature applications. Practical diameters for stiff filamentary members 44 range between 0.030 and 0.010 inches depending upon the diameter and material used in the flexible filamentary members comprising the tubular body 50. Monofilaments are preferred to achieve stiff loops which will adequately support the tubular body 50.

Preferred materials for the more flexible filamentary members 46 also include polymerics such as nylon, polyester, polypropylene, polyethylene and polytetrafluoroethylene. Metals such as steel, titanium, nitinol, elgiloy are also feasible. Glass fibers or quartz fibers are favored for high temperature applications. Practical diameters for the filamentary members 46 range between 0.015 and 0.005 inches. Multifilament yarns provide increased flexibility and help ensure a convolute shape for the sleeve. The choice of material and diameter for both filamentary members 42 and 46 are made in view of the purpose of the sleeve, the expected environment, as well as the relative stiffness required between the filamentary members, it being understood that the convolute shape is formed when filamentary members 42 have greater stiffness than the filamentary members 46 comprising the tubular body 50.

Figure 4:
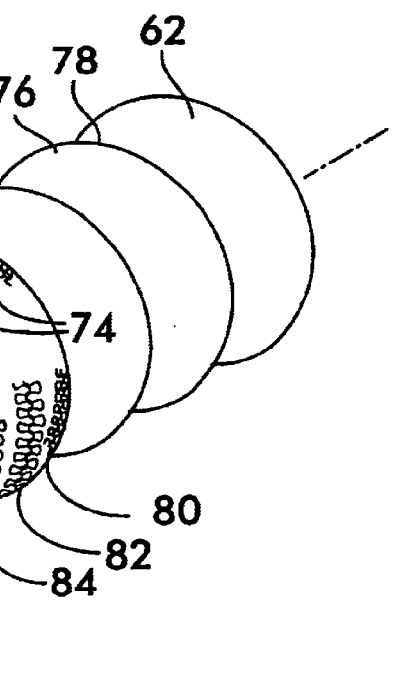
FIG. 4 is a partial perspective view of yet another embodiment of a knitted convolute sleeve according to the invention.

FIG. 4 shows another embodiment of the convolute sleeve 60 according to the invention, the sleeve comprising a tubular body 62 formed of a plurality of first and second longitudinally extending regions 64 and 66 arranged in spaced relation coaxially along an axis 68. The first and second regions 64 and 66 are positioned adjacent one another in an alternating pattern and are formed of a plurality of filamentary members 70 knitted in a plurality of courses 72 extending circumferentially around and along axis 68. Each course comprises a plurality of loops 74. Being a convolute, the sleeve 60 has crests 76 which project radially outwardly from the sleeve and troughs 78 between the crests. The crests and troughs are formed by varying the stiffness of the first and second regions 64 and 66 relatively to each other. The stiffness of the regions maybe varied by varying knitting parameters such as the density and/or length of the loops forming the courses, or by changing the material from which the regions are knitted.

Loop density is controlled by the size of the loops 74 and the tension under which the filamentary members 70 are knitted. Loop size is determined by the length of travel of the needles during knitting which is controlled by the adjustment of cams which move the needles in the knitting machine. Tension is controlled by various forms of mechanical tensioning devices which place more or less tension on the filamentary members being fed to the knitting machine.

Crests 76 may be formed by courses 72 having relatively large loops 74 in second regions 66 knitted under relatively lower tension providing low stitch density and allowing the second regions 66 to project outwardly to form each crest. Troughs 78 are formed by courses 72 in the first regions 64 having relatively small loops 74 knitted under higher tension providing higher loop density, thereby increasing the stiffness of the first regions 64 and drawing the sleeve radially inwardly. The distance between crests and troughs is controlled by the number of courses knit with longer loops under lower tension and the number of courses knit with shorter loops under higher tension. It is possible to program modern knitting machines to knit a first plurality of courses 80 at a first tension and a first needle travel distance, for example, a relatively high tension and a relatively short needle travel distance and then continuously knit a second plurality of courses 82 at a lower tension with a longer needle travel, followed by a third plurality of courses 84 knitted at the high tension and short needle travel. Repeating this pattern of knitting will produce the convolute sleeve 60 shown in FIG. 4.

The relative stiffness of the regions 64 and 66 may also be varied by varying the stiffness of the filamentary members 70 forming the regions. Troughs 78 are formed by knitting first regions 64 from relatively stiffer filamentary members 86, such as monofilaments, whereas crests 76 are formed by knitting the second regions from more flexible filamentary members 88 such as multi-filament yarns.

Preferred materials for the filamentary members 70 include polymerics such as nylon, polyester, polypropylene, polyethylene and polytetrafluoroethylene, as well as DREF yarns. Metals such as steel, titanium, nitinol, elgiloy are also feasible. Glass fibers or quartz fibers are favored for high temperature applications. Heat shrinkable materials such as thermoplastics are also useful and may be inlaid with the knit and then later heat shrunk to help form the troughs. Both monofilaments and multifilament yarns are feasible. The knit structure may be single or double knit.

The various embodiments of the convolute protective sleeve according to the invention provide a convolute sleeve which is economical to produce and versatile in application, able to be tailored by choice of material to protect elongated substrates from the adverse effects of any number of harsh environments.

What is claimed is:

1. An elongated convolute sleeve for protecting elongated substrates, said sleeve comprising:
   a plurality of tubular first segments positioned coaxially in spaced relation lengthwise along an axis, each of said first segments being formed of a plurality of flexible, resilient first filamentary members knitted in a plurality of first courses, each of said segments having outwardly flared ends oppositely disposed; and a plurality of tubular second segments, each being formed of a plurality of second filamentary members having relatively greater flexibility than said first filamentary members, said second filamentary members being knitted in a plurality of second courses, each of said second segments being coaxially positioned along said axis and joined end to end in an alternating pattern with said first segments by interknitting ends of said second segments with said flared ends of said first segments, said first segments forming a plurality of troughs and said second segments form a plurality of crests projecting radially outwardly from said sleeve.

2. A convolute sleeve according to claim 1, wherein said first filamentary members each comprise at least one monofilament.

3. A convolute sleeve according to claim 2, wherein said monofilament comprises a polymeric material selected from the group consisting of polyester, nylon, polypropylene and polyethylene.

4. A convolute sleeve according to claim 2, wherein said monofilament comprises a metallic material selected from the group consisting of steel, aluminum, copper, titanium, nitinol and elgiloy.

5. A convolute sleeve according to claim 1, wherein said second filamentary members comprise a multi-filament yarns.

6. A convolute sleeve according to claim 5, wherein said multi-filament yarns comprise a polymeric material selected from the group consisting of polyester, nylon and polytetrafluoroethylene.

7. A convolute sleeve according to claim 1, wherein the ratio of courses of said first filamentary members to said courses of said second filamentary members ranges between 3 to 2 and 5 to 1.

8. An elongated convolute sleeve for protecting elongated substrates, said sleeve comprising:
  a tubular body having a nominal diameter and formed of a plurality of flexible, resilient filamentary members knitted in a plurality of circumferential courses extending substantially coaxial with and lengthwise along an axis; and
  a plurality of resilient hoops positioned in spaced relation lengthwise along said tubular body coaxially with said axis, said hoops each having a respective diameter greater than said nominal diameter of said body and being interlaced with said filamentary members thereby fixing said hoops to said body, said diameter of said body being substantially equal to said hoop diameters at spaced intervals along said body where said hoops are interlaced with said filamentary members, said monofilament being relatively stiffer than said filamentary members forming said tubular body, said hoops forcing said body outwardly to form crests in spaced relation to one another along said axis, troughs being formed by said body between each said hoop.

9. A convolute sleeve according to claim 8, wherein said hoops are formed of a substantially continuous, resilient monofilament, each said resilient monofilament including an axial strand portion extending substantially lengthwise along said tubular body and connecting neighboring hoops.

10. A convolute sleeve according to claim 9, wherein said axial strand portion is interlaced with said filamentary members forming said tubular body.

11. A convolute sleeve according to claim 9, wherein said axial strand portion floats on a surface of said tubular body.

12. A convolute sleeve according to claim 8, wherein said hoops comprise a resilient polymeric monofilament selected from the group consisting of polyester, nylon, polypropylene, polytetrafluoroethylene and polyethylene.

13. A convolute sleeve according to claim 8, wherein said hoops are interlaced with said filamentary members by laying in.

14. An elongated convolute sleeve for protecting elongated substrates, said sleeve comprising a tubular body having a plurality of first and second longitudinally extending regions arranged in spaced relation coaxially along an axis, said first and second regions being positioned adjacent one another in an alternating pattern, said regions being formed from a plurality of filamentary members knitted in a plurality of courses, each said course comprising a plurality of loops extending circumferentially around said axis, said first regions having a stiffness different from the stiffness of said second regions and thereby forming a plurality of alternating crests and troughs in said tubular body lengthwise along said axis.

15. A convolute sleeve according to claim 14, wherein said stiffness of said first and said second regions are varied by changing at least one of the length and density of the loops forming said first and said second regions.

16. A convolute sleeve according to claim 15, wherein said density of said loops in said first regions is greater than said density of said loops in said second region thereby forming troughs in said first regions and crests in said second regions.

17. A convolute sleeve according to claim 15, wherein said length of said loops in said first regions is less than the lengths of said loops in said second regions thereby forming troughs in said first regions and crests in said second regions.

18. A convolute sleeve according to claim 14, wherein said stiffness of said first and said second regions are varied by varying the material from which said first and said second regions are formed.

19. A convolute sleeve according to claim 18, wherein said first regions are formed from a first filamentary member and said second regions are formed from a second filamentary member, said first filamentary member being stiffer than said second filamentary member and thereby forming troughs in said first regions and crests in said second regions.

20. A convolute sleeve according to claim 19, wherein said first filamentary members comprise a monofilament.

\* \* \* \* \*